United States Patent
Garimella et al.

(10) Patent No.: US 10,100,768 B2
(45) Date of Patent: Oct. 16, 2018

(54) ENGINE-OUT EMISSIONS CONTROLS

(71) Applicant: Cummins Inc., Columbus, IN (US)

(72) Inventors: Phanindra V. Garimella, Bloomington, IN (US); Andrew W. Osburn, Nashville, IN (US); Ming-Feng Hsieh, Nashville, IN (US)

(73) Assignee: Cummins Inc., Columbus, IN (US)

( * ) Notice: Subject to any disclaimer, the term of this patent is extended or adjusted under 35 U.S.C. 154(b) by 179 days.

(21) Appl. No.: 15/144,956

(22) Filed: May 3, 2016

(65) Prior Publication Data
US 2016/0245208 A1 Aug. 25, 2016

Related U.S. Application Data

(63) Continuation of application No. PCT/US2014/063790, filed on Nov. 4, 2014.
(Continued)

(51) Int. Cl.
*F02D 41/14* (2006.01)
*F02D 41/40* (2006.01)
(Continued)

(52) U.S. Cl.
CPC ......... *F02D 41/1461* (2013.01); *F02D 37/02* (2013.01); *F02D 41/0007* (2013.01);
(Continued)

(58) Field of Classification Search
CPC ............. F02D 41/1461; F02D 41/1441; F02D 41/1456; F02D 41/0052; F02D 41/40;
(Continued)

(56) References Cited

U.S. PATENT DOCUMENTS

| 6,360,159 B1 | 3/2002 | Miller et al. |
| 6,422,219 B1 | 7/2002 | Savonen et al. |

(Continued)

OTHER PUBLICATIONS

International Search Report and Written Opinion, PCT/US2014/063790, dated Feb. 12, 2015, Cummins Inc., 14 pgs.

*Primary Examiner* — Hung Q Nguyen
*Assistant Examiner* — Xiao Mo
(74) *Attorney, Agent, or Firm* — Taft Stettinius & Hollister LLP (57) ABSTRACT

Unique apparatuses, methods, and systems including engine-out emissions controls are disclosed. One embodiment is a system including an internal combustion engine system including at least one fueling actuator and at least one air handling actuator and an electronic controller. The electronic structure may be structured to determine initial values for a plurality of combustion references, determine a plurality of target emissions values or ranges based upon the plurality of combustion references, determine errors between the emissions target values or ranges and sensed emissions information, determine correction factors and weighting factors for the combustion references, the weighting factors being based at least in part upon the errors between the between the emissions target values or ranges and sensed emissions information, selectably determine modified values for the combustion references based upon the correction factors and the weighting factors, and control operation of the at least one fueling actuator and at least one air handling actuator based upon the modified values.

22 Claims, 3 Drawing Sheets

Related U.S. Application Data (60) Provisional application No. 61/899,484, filed on Nov. 4, 2013.

(51) Int. Cl.
 F02D 37/02 (2006.01)
 F02D 41/00 (2006.01)

(52) U.S. Cl.
 CPC ..... F02D 41/0052 (2013.01); F02D 41/1441 (2013.01); F02D 41/1456 (2013.01); F02D 41/40 (2013.01); *F02D 2041/141* (2013.01); *F02D 2200/0614* (2013.01); *F02D 2200/101* (2013.01); *Y02T 10/144* (2013.01); *Y02T 10/44* (2013.01); *Y02T 10/47* (2013.01)

(58) Field of Classification Search
 CPC ............... F02D 37/02; F02D 41/0007; F02D 2041/141; F02D 2200/0614; F02D 2200/101; Y02T 10/144; Y02T 10/44; Y02T 10/47
 See application file for complete search history.

(56) References Cited

U.S. PATENT DOCUMENTS

| | | |
|---|---|---|
| 6,758,185 B2 | 7/2004 | Surnilla et al. |
| 6,882,929 B2 | 4/2005 | Liang et al. |
| 6,899,093 B2 | 5/2005 | Center |
| 6,915,630 B2 | 7/2005 | Surnilla et al. |
| 7,155,334 B1 | 12/2006 | Stewart et al. |
| 7,212,908 B2 | 5/2007 | Li et al. |
| 7,322,340 B2 | 1/2008 | Ohga |
| 7,392,129 B2 | 6/2008 | Hill et al. |
| 7,415,389 B2 | 8/2008 | Stewart et al. |
| 7,614,231 B2 | 11/2009 | Allain et al. |
| 7,831,378 B2 | 11/2010 | Wills |
| 7,832,197 B2 | 11/2010 | Leone |
| 7,861,518 B2 | 1/2011 | Federle |
| 7,878,178 B2 | 2/2011 | Stewart et al. |
| 8,109,255 B2 | 2/2012 | Stewart et al. |
| 2006/0016174 A1* | 1/2006 | Surnilla ............ F01N 3/0842 60/276 |
| 2006/0016175 A1 | 1/2006 | Surnilla et al. |
| 2006/0283174 A1 | 12/2006 | Leone et al. |
| 2007/0039589 A1 | 2/2007 | Stewart et al. |
| 2008/0264036 A1 | 10/2008 | Bellovary |
| 2009/0240388 A1 | 9/2009 | Harris |
| 2010/0058738 A1 | 3/2010 | Webb et al. |
| 2011/0214650 A1 | 9/2011 | Wang et al. |
| 2012/0167665 A1* | 7/2012 | Garimella ......... F02D 41/0072 73/23.31 |
| 2013/0131967 A1* | 5/2013 | Yu ..................... F02D 41/1462 701/115 |

* cited by examiner

ENGINE-OUT EMISSIONS CONTROLS

CROSS-REFERENCE TO RELATED APPLICATIONS

The present application is a continuation of International Application No. PCT/US2014/063790 filed on Nov. 4, 2014, which claims the benefit of the filing date of U.S. Provisional Application Ser. No. 61/899,484 filed on Nov. 4, 2013, each of which is incorporated herein by reference in its entirety.

BACKGROUND

The present application relates generally to controls for internal combustion engines. Many efforts have been made to reduce internal combustion engine emissions. For diesel engines oxides of Nitrogen (NOx) and particulate emissions are significant areas of interest. Engine-out NOx emissions for Diesel engines can be significantly different at similar operating conditions (e.g., speed-fueling conditions) due to variations from sensor measurements, changes in backpressure due to differences in the loading of a diesel particular filter (DPF), and uncertainty and variation in ambient conditions. Significant variation in engine-out NOx emissions can be caused by variations induced by air-handling system components which may include the EGR loop, the air-loop and exhaust back-pressure variation. Variation in engine-out emissions can result in inefficient or inadequate operation of post-engine emissions control or reduction systems and may result in an increased number or frequency of regeneration events such as for a particulate filter, an increase in consumption of reductant such as diesel exhaust fluid, and/or undesired emissions increases. Existing attempts at emissions control suffer from a number of drawbacks and limitations. There remains a significant need for the unique apparatuses, controls, methods, and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Unique apparatuses, methods, and systems including engine-out emissions controls are disclosed. One embodiment is a method of controlling an internal combustion engine system including at least one fueling actuator and at least one air handling actuator. The method may utilize an electronic controller to determine initial values for a plurality of combustion references, determine a plurality of target emissions values or ranges based upon the plurality of combustion references, determine errors between the emissions target values or ranges and sensed emissions information, determine correction factors and weighting factors for the combustion references, the weighting factors being based at least in part upon the errors between the between the emissions target values or ranges and sensed emissions information, selectably determine modified values for the combustion references based upon the correction factors and the weighting factors, and control operation of the at least one fueling actuator and at least one air handling actuator based upon the modified values. Further embodiments, forms, objects, features, advantages, aspects, and benefits shall become apparent from the following description and drawings.

DETAILED DESCRIPTION OF ILLUSTRATIVE EMBODIMENTS

Figure 1:
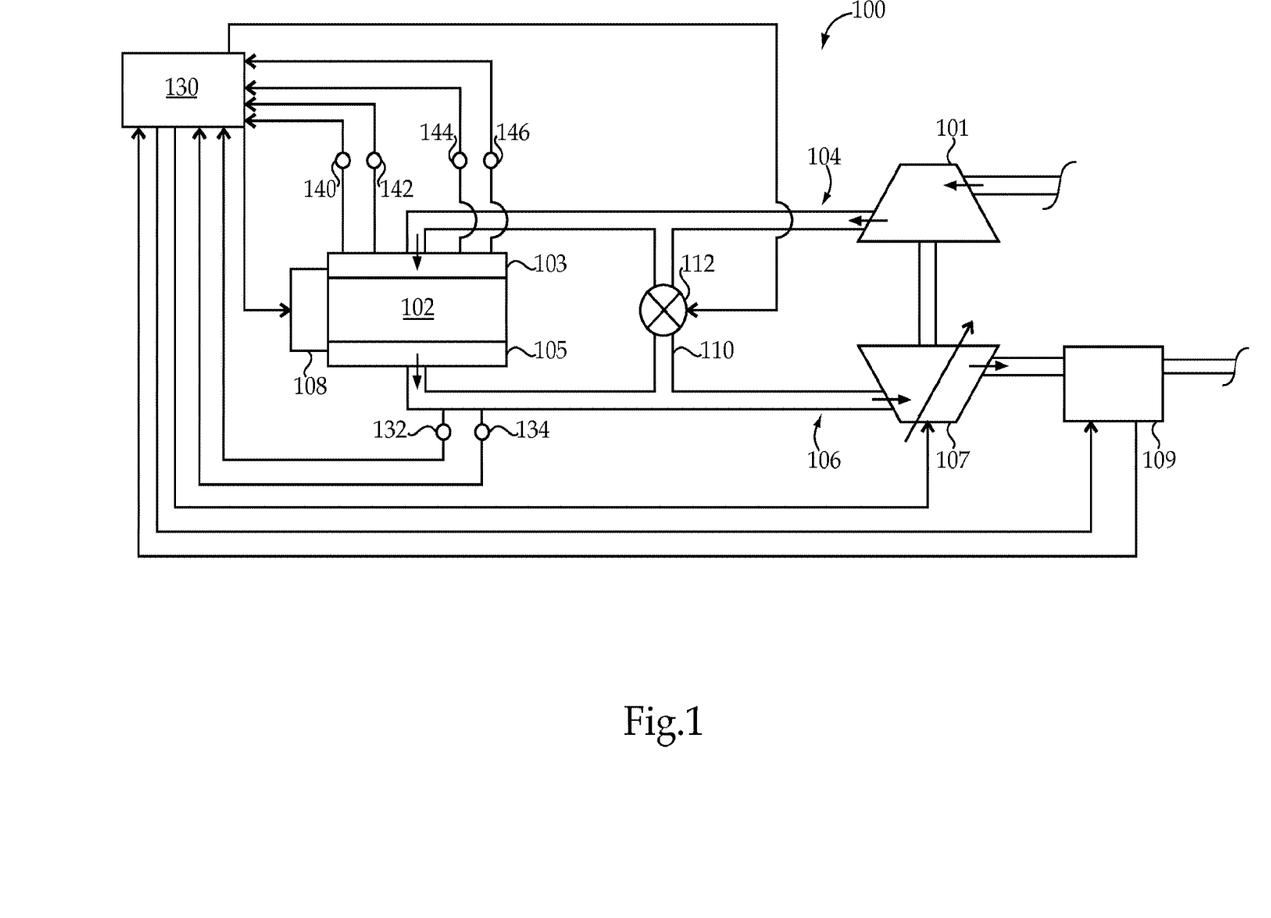
FIG. 1 is a schematic illustration of an exemplary system including an engine and exhaust aftertreatment system.

With reference to FIG. 1 there is illustrated an exemplary system 100 including an engine 102, an intake system 104 through which charge air enters system 100 and an exhaust system 106 through which exhaust gas resulting from combustion exits system 100. Intake system 104 includes turbocharger compressor 101 which provides compressed charge air to intake manifold 103 and then to the cylinders of engine 102. Exhaust system 106 includes an exhaust manifold 105 which receives combustion exhaust from the cylinders of engine 102 and provides exhaust to drive turbocharger turbine 107 which, in turn, drives compressor 101. In the illustrated embodiment turbine 107 is a variable geometry turbine which includes an actuator structured to vary the geometry of the flowpath through the turbine and/or the turbine inlet. In other embodiments turbine 107 may be of other types, for example, a fixed geometry turbine or a wastegated turbine. Exhaust exiting turbine 107 is provided to exhaust aftertreatment system 109 which is structured to mitigate one or more undesired exhaust constituents. In one form exhaust aftertreatment system 109 includes an oxidation catalyst structured to mitigate hydrocarbon emissions, a particulate filter structured to mitigate particulate emissions, and an SCR catalyst structured to mitigate emissions of oxides of nitrogen (NOx)

System 100 further includes fueling system 108 which is structured to control the introduction of fuel into the cylinders of engine 102. In the illustrated embodiment fueling system 108 is structured as a high pressure common rail injection system which includes a high pressure pump that pressurizes fuel in a common rail and a plurality of controllable injectors structured to selectably inject fuel directly into respective cylinders of engine 102. System 100 also includes EGR valve 112 which is provided to control flow of recirculated exhaust from the exhaust system 106, though an EGR conduit 110 to the intake system 104.

System 100 includes controller 130 which is structured to perform certain operations including receiving and processing signals from various components and sensors of system of system 100 and providing signals to control the operation of various components of system 100. It shall be appreciated that the controller or control module may be provided in a variety of forms and configurations including one or more microprocessor-based controllers or control modules forming a whole or part of a processing subsystem having one or more non-transitory computer readable memories storing computer executable instructions, as well as processing, and communication hardware.

In the illustrated embodiment, controller 130 is structured to provide signals to control actuators associated with fueling system 108, variable geometry turbine 107, EGR valve 112 and aftertreatment system 109, as well as other components of system 100. In various embodiments controller 130 may be structured to control other actuators including, for example, an intake throttle, an exhaust throttle, and/or a turbine wastegate among other actuators.

In the illustrated embodiment, system 100 includes a mass air flow sensor 142, an intake air temperature sensor 144, an intake air pressure sensor 146, and an intake manifold pressure (MAP) sensor 140, each in fluid communication with the intake system 104. It shall be appreciated that various sensors depicted in system 100 may be positioned in locations varying from the illustrated locations. The intake system sensors sensor need not be in direct communication with intake system 104, and can be located at any position within intake system 104 that provides a suitable indication of applicable intake system 104 readings. It shall be further appreciated that in some forms the sensor may by virtual sensor.

System 100 includes an engine-out oxygen sensor 132 and an engine out NOx sensor 134 in fluid communication with the exhaust system 106 and connected to controller 130. Engine-out oxygen sensor 132 is operable to provide a measurement of the level or amount of oxygen in the exhaust output by engine 102 prior to the effect of downstream components such as aftertreatment system 109. NOx sensor 134 is operable to provide a measurement of the amount or level of NOx in the exhaust gas in the exhaust output by engine 102 prior to the effect of downstream components such as aftertreatment system 109. In certain forms sensors 132 and 134 may utilize one or more physical sensors sensitive to both the presence of Oxygen and NOx and may perform calculations on this sensor output to determine an engine out Oxygen value or an engine out air to fuel ratio (AFR) value and an engine out NOx value. Controller 130 may also be structured to receive a variety of additional inputs from additional sensor of system 100 including, for example, an engine speed input, an engine load input, an engine out particulate matter (PM) input, a mass air flow input, an intake air temperature input, an intake air pressure input, and/or a fuel rail pressure input. It shall be appreciated that in some forms the sensor may include one or more virtual sensors. Thus, it is contemplated that inputs to controller 130 can be provided from physical sensors and/or from virtual sensors structured to calculate or estimate sensed parameters based upon other sensors and/or operating parameters.

The controller 130 includes stored data values, constants, and functions, as well as operating instructions stored on computer readable medium. Any of the operations of exemplary procedures described herein may be performed at least partially by controller 130. The description herein including modules emphasizes the structural independence of the aspects of controller 130, and illustrates one grouping of operations and responsibilities of controller 130. Other groupings that execute similar overall operations are understood within the scope of the present application. Modules may be implemented in hardware and/or software on computer readable medium, and modules may be distributed across various hardware or software components. Further details of certain embodiments of controller operations are described in connection with FIG. 2.

Figure 2:
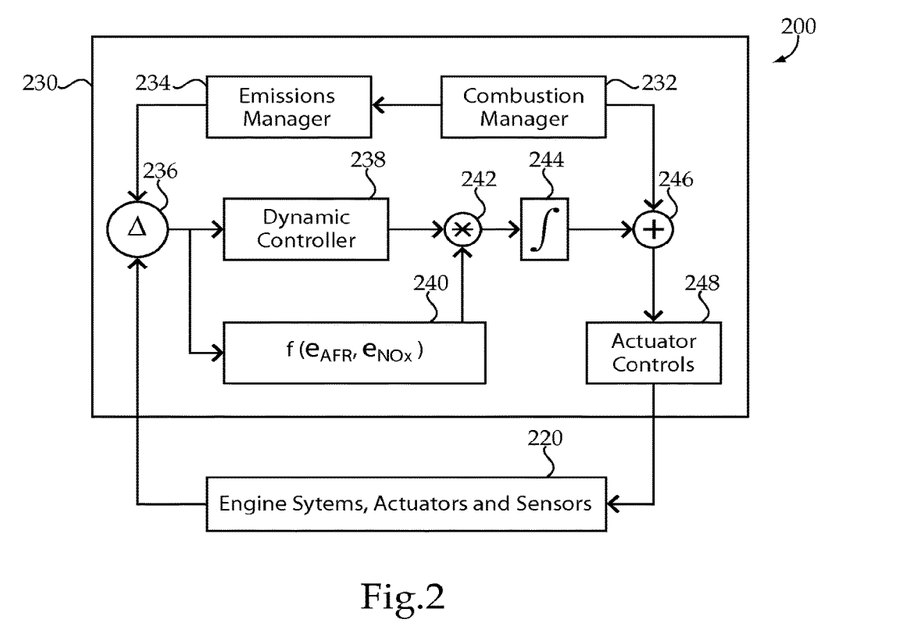
FIG. 2 is a schematic illustration of an exemplary control system.

With reference to FIG. 2 there is illustrated a schematic diagram of an exemplary control system 200 including controlled system 220 and electronic controller 230. System 220 includes a number of engine systems, actuators and sensors. In certain forms system 220 includes the engine systems, actuators and sensors, illustrated and described above in connection with FIG. 1 and electronic controller 230 includes the communication and control interconnections of electronic controller 130 illustrated and described above in connection with FIG. 1. In other forms, system 220 may include additional or alternate engine systems, actuators and sensors and controller 230 may include additional or alternate communication and control interconnections.

Controller 230 includes number of controls which are illustrated schematically in FIG. 2. It shall be appreciated that the controls described herein may also be implemented in connection with a variety of additional or alternate control systems including the alternative configurations disclosed herein. The illustrated controls and their respective functionalities may be reconfigured, redistributed, supplemented, or combined. It shall also be appreciated that the controls described in the present application may be implemented in various combinations of hardware, firmware and/or software which may be provided in a single microprocessor based controller or control module or in a plurality of microprocessor based controllers or control modules such as a distributed controller system in which a plurality of controllers communicate over a network such as a controller area network (CAN).

With continuing reference to FIG. 2, controller 230 includes combustion manager 232 which is configured to determine a plurality of combustion reference values during operation of system 220. As utilized herein, combustion references refer to parameters which are referenced by a controller in determining commands for one or more actuators effecting the combustion constituents provided to the cylinders of an engine. Combustion references may be contrasted with direct control parameters specify particular actions or results, e.g., direct emissions control parameters specifying an amount or range for one or more emissions constituents and direct actuator control parameters which specify the state or movement of an actuator. It shall be appreciated that combustion references may comprise setpoints that are generated to manage multiple tradeoff functions and are provided to the various sub-system level controllers, and that direct control parameters may utilize combustion references to control each of the subsystems by modulating actuators. In certain forms, the combustion reference values are determined utilizing a plurality of tables which specify values for combustion reference parameters as a function of engine operating conditions. In certain forms the engine operating conditions comprise engine speed and torque demand from the powertrain system (vehicle or application), and the combustion references parameters comprise EGR flow, charge flow, fueling quantity and injection timing for multiple pulses, and injector rail pressure. Combustion manager provides the determined combustion reference values to emissions manager 234 and to operator 246.

Emissions manager 234 determines one or more engine-out emissions target values or ranges based upon the combustion reference values provided by combustion manager 234 during operation of system 220. In certain forms the forms the engine-out emissions target values or ranges comprises a engine-out NOx target value or range and an engine-out AFR value or range. It shall be appreciated that the engine-out AFR value or range may be expressed or defined in terms of oxygen content of the exhaust output by the engine as well as air-fuel ratios of the exhaust output by the engine including ratios of air to fuel, ratios of fuel to air, air-fuel equivalence ratios sometimes referred to as lambda, and other ratios defining relationships between the air and fuel involved in combustion. The charge-fuel ratio of the system (charge being defined as the air-flow+EGR flow in Diesel engines and air-flow+fuel+egr flow in SI engines such as natural gas and gasoline systems) is another significant variable that defines the relation between various inputs to the combustion process. It shall be appreciated that the charge-fuel ratio at the inlet of the engine may also be measured and utilized in the combustion control process. The engine-out emissions target values or ranges may also be based upon overall emissions criteria which take into account the capacity or ability of downstream exhaust aftertreatment systems and components to meet ambient emissions criteria or targets as well as targets for the efficiency of their operation such as minimizing regeneration events, and reducing reductant consumption.

Emissions manager 234 provides the determined engine-out emissions target values to operator 236 which also receives sensed engine-out emissions information of system 220. It shall be appreciated that the sensed engine-out emissions information may comprise the output of a physical sensor associated with system 220, a virtual sensor structured to determine or estimate a parameter associated with system 220 or a combination thereof. Operator 236 determines a difference or error between the determined engine-out emissions target values received from emissions manager 234 and the sensed engine-out emissions information of system 220.

Operator 236 provides the determined difference or error to dynamic controller 238 and to operator 240. Dynamic controller 238 determines correction factors for the combustion reference parameters based upon the determined difference or error received from operator 236. Exemplary correction parameters that are based on a determined error include the modification or modulation of the amount of EGR fraction and charge-fuel ratio set-points provided to the air-handling control system. For example, if the engine calibration asks for a certain amount of EGR fraction and charge flow, the correction factors may adjust these parameters based on the measurement of the engine-out NOx and AFR. Other correction parameters that may be applied include the modification of the fuel pulse timing (typically referred to as start of injection) and fuel rail pressure. Operator 240 determines weighting factors associated with the correction factors as a function of the determined difference or error received from operator 236. In certain forms, operator 240 determines weighting factors in accordance with the logic illustrated and described in connection with FIG. 4 described in further detail below. In the illustrated form, dynamic controller 238 is structured to determine correction factors for each combustion reference parameter that may potentially be adjusted regardless of the weighting factors that are determined in parallel by operator 240. In other forms, the weighting factors may be determined in advance of determining the correction factors, and only the correction factors which have non-zero weightings are then determined.

Dynamic controller 238 and operator 240 provide their respective outputs to operator 242 which applies the weighting factors determined by operator 240 to the correction factors determined by dynamic controller 242 and outputs the weighting-adjusted correction factors to operator 244. Operator 244 is structured to integrate the weighting-adjusted correction factors over time. The output of operator 244 is provided to operator 246 which applies the time-integrated weighting-adjusted correction factors received from operator 244 to the combustion reference values received from combustion manager 232 to provide modified combustion reference values.

The modified combustion reference values determined by operator 246 are provided to actuator controls 248 which determine control parameters for one or more actuators associated with system 220. The control parameters may include control parameters for one or more of a variable geometry turbine, a turbocharger wastegate, an EGR valve, an injector rail pump, an injector actuator, an intake throttle, and an exhaust throttle. The control parameters determined by actuator controls 248 are used to control respective actuators of system 220.

Figure 3:
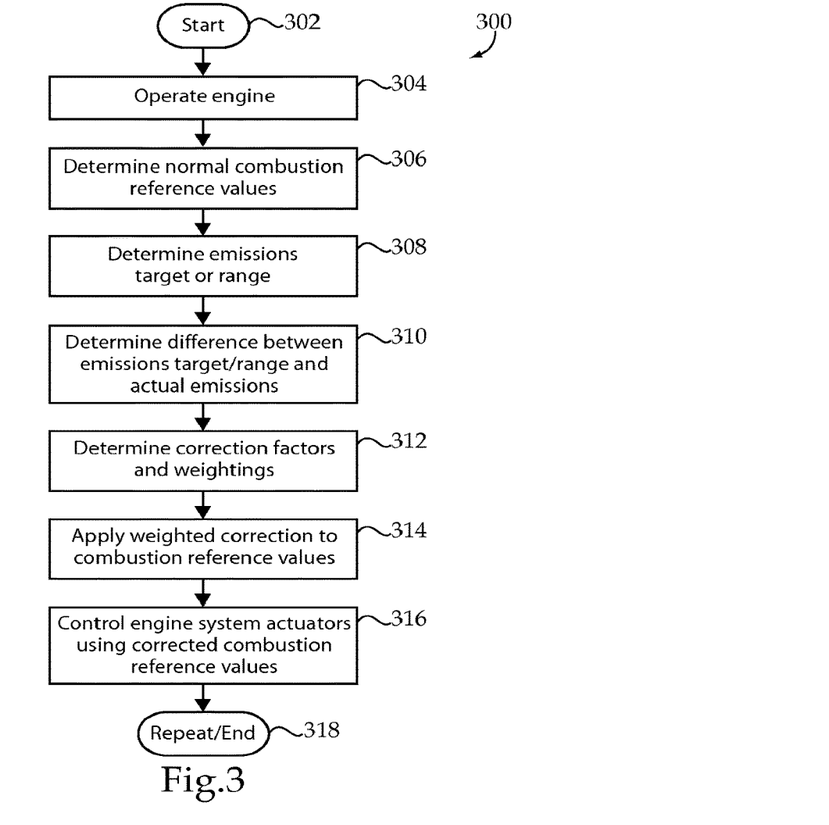
FIG. 3 is a flow diagram illustrating an exemplary controls process.

With reference to FIG. 3 there is illustrated a flowchart describing an exemplary controls process 300. Process 300 is initiated at start operation 302 and proceeds to operation 304 which confirms that the engine system under control is operating and is in an operating state suitable for utilization of process 300. From operation 304 process 300 proceeds to operation 306 which determines nominal values for a plurality of combustion reference parameters and provides the nominal combustion reference values to operation 308.

Operation 308 determines an emissions target or range based upon the nominal combustion reference values received from operation 306 and provides the emissions target or range to operation 310. Operation 310 determines a difference or error between the emissions target or range received from operation 308 and sensed emissions information, and provides this difference or error to operation 312. Operation 312 determines correction factor values and respective weightings for correction factor values based upon the input received from operation 310, and provides the correction factor values and respective weightings to operation 314.

Operation 314 applies the correction factor values and respective weightings to modify the nominal combustion reference values determined by operation 306 and provides the modified combustion reference values to operation 316. Operation 316 controls one or more engine system actuators using the modified combustion reference values. From operation 316, process 300 proceeds to operation 318 and may repeat or end.

Figure 4:
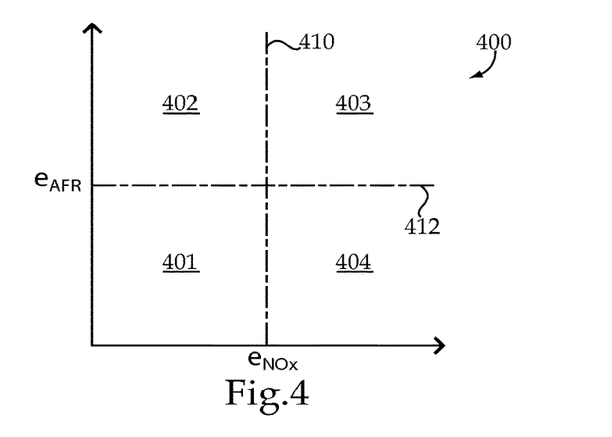
FIG. 4 is a graph illustrating exemplary controls logic.

With reference to FIG. 4 there is illustrated a graph 400 depicting control logic which may be implemented and executed by a component of a control system such as operator 240 described above in connection with FIG. 2. The x-axis of graph 400 represents the magnitude of a difference or error between a target engine-out NOx value or range and a sensed engine-out NOx (eNOx). The y-axis of graph 400 represents the magnitude of a difference or error between a target engine-out AFR value or range and a sensed engine-out AFR value or range (eAFR).

Graph 400 includes thresholds 410 and 412 which define regions 401 402, 403 and 404. In certain embodiments thresholds 410 and 412 may be static or may be static over certain operating conditions or durations. In certain embodiments thresholds 410 and 412 may be dynamically determined. The determination of the thresholds 410 and 412 may be based upon the input of various sub-systems. For example, if it is determined that the state of the aftertreatment could support an increase in the amount of the NOx from the engine, the threshold 410 could be modified. The determination of these thresholds would be based on optimizing the system behavior of overall fuel and DEF (urea) consumption. Regions 401 402, 403 and 404 may be utilized to determine correction factor weightings.

In region 401, the magnitude of eNOx and eAFR are deemed to be sufficiently low that all correction factor weightings may be set to zero and no correction is performed. In certain embodiments the weightings may alternately be set to non-zero values which are selected to limit the amount of correction that occurs.

In region 402, the magnitude of eNOx is deemed acceptable and no correction of the associated combustion reference values is deemed necessary while the magnitude of eAFR is deemed to warrant correction of its associated combustion reference values. To reduce eAFR the charge flow combustion reference may be increased. Other possible actions include changing the EGR flow reference or Air-Flow reference. Increasing the charge flow combustion reference without modifying the EGR Flow reference has a supervisory control effect on engine-out emissions via the air-handling control system which controls actuators associated with charge flow (e.g., variable geometry turbocharger, or turbocharger wastegate actuators) resulting in a decrease in the amount of engine-out particulate or smoke which may result from incomplete combustion.

In region 403, the magnitude of both eNOx and eAFR are deemed to warrant correction of their associated combustion reference values. To reduce eAFR and eNOx the charge flow combustion reference may be increased. Additionally, one or more fueling related combustion reference values may be adjusted and/or EGR flow may be increased. Adjusting the fueling related combustion reference values may include, for example, increasing injector rail pressure, advancing start of injection and/or adjusting other fuel injection related combustion reference parameters. As noted above, increasing the charge flow combustion reference has a supervisory control effect on engine-out emissions via actuators associated with charge flow (e.g., variable geometry turbocharger, or turbocharger wastegate actuators) resulting in a decrease in the amount of engine-out particulate or smoke which may result from incomplete combustion. It shall be appreciated that adjusting the more fueling related combustion reference values and/or EGR flow values has a supervisory control effect on engine-out emissions via actuators which may be varied to decrease engine-out NOx.

In region 404, the magnitude of eAFR is deemed acceptable and no correction of the associated combustion reference values is deemed necessary while the magnitude of eNOx is deemed to warrant correction of the associated combustion reference values. To reduce eNOx the EGR flow combustion reference may be increased. It shall be appreciated that increasing the EGR flow combustion reference has a supervisory control effect on engine-out emissions via actuators associated with exhaust gas recirculation resulting in a decrease in the amount of engine-out NOx.

It shall be appreciated that regions 401, 402, 403 and 404 are one example of a weighting heuristic that may be utilized by the controls herein to specify which combustion reference parameters to correct for different operational conditions. A number of additional examples are also contemplated. In certain forms additional regions may be defined by additional thresholds. In certain forms alternate regions may be defined by alternate thresholds. For example, when additional hardware is applied on the engine for energy recovery (e.g., waste heat recovery system) it may be desirable to balance the needs for optimal energy recovery with managing the after-treatment system. To help with this, additional thresholds which reflect the energy recovery needs as defined by exhaust temperature and flow may also be added.

From the foregoing description it shall be appreciated that certain controllers, control systems and control processes disclosed herein may utilize engine-out emissions measurements or estimates to provide supervisor emissions controls by modulating combustion references as opposed to actively trying to control the emissions directly by utilizing them as direct control references. Certain controllers, control systems and control processes disclosed herein may utilize a heuristic mechanism to determine not only how much to correct each of a plurality of combustion references but also when to correct each of the combustion references to maintain robust emission performance with optimal DEF and fuel consumption impact.

A number of non-limiting embodiments shall now be further described. One embodiment is a method comprising: determining with a control system structured to control operation of an internal combustion engine system initial values for a plurality of combustion reference parameters; determining with the control system a first difference between an engine-out NOx value for the engine and a target engine-out NOx value and a second difference between an engine-out AFR value for the engine and a target engine-out AFR value; selecting with the control system which if any of the initial values to modify based upon the first difference and the second difference; determining with the control system respective modification values for each of the initial values which is selected; modifying with the control system each of the initial values which is selected based upon the one or more respective modification values to provide respective modified values; and determining with the control system one or more actuator control values based upon the values of the combustion reference parameters including the one or more modified values; and controlling with the control system at least one of an air handling system actuator and a fueling system actuator utilizing the one or more actuator control values. In certain forms of the method the plurality of combustion reference values comprise an EGR reference value, a charge flow reference value, a fueling quantity reference value, an injection timing reference value, and a rail pressure reference value. In certain forms the act of selecting comprises: selecting at least the charge flow reference value if the first difference does not exceed a first difference threshold, and the second difference exceeds a second difference threshold; selecting at least the EGR reference value if the first difference exceeds the first difference threshold, and the second difference does not exceed the second difference threshold; selecting at least one of the fueling quantity reference value, the injection timing reference value, and the rail pressure reference value if the first difference exceeds the first difference threshold, and the second difference exceeds the second difference threshold; and selecting none of the plurality of combustion reference values if the first difference does not exceed the first difference threshold, and the second difference does not exceed the second difference threshold. In certain forms the act of selecting comprises selecting all of the plurality of combustion reference values if the first difference exceeds the first difference threshold and the second difference exceeds the second difference threshold. In certain forms the act of selecting comprises: selecting only the charge flow reference value if the first difference does not exceed a first difference threshold, and the second difference exceeds a second difference threshold; and selecting only the EGR reference value if the first difference exceeds the first difference threshold, and the second difference does not exceed the second difference threshold. In certain forms the act of controlling at least one of an air handling system actuator and a fueling system actuator with the control system is based upon a static relationship between the plurality of combustion reference parameters and one or more engine operating conditions. In certain forms the one or more engine operating conditions comprise engine speed and engine fueling.

One embodiment is a system comprising: an internal combustion engine system including at least one fueling actuator and at least one air handling actuator; and an electronic controller structured to: determine initial values for a plurality of combustion references, determine a plurality of target emissions values or ranges based upon the plurality of combustion references, determine errors between the emissions target values or ranges and sensed emissions information; determine correction factors and weighting factors for the combustion references, the weighting factors being based at least in part upon the errors between the between the emissions target values or ranges and sensed emissions information, selectably determine modified values for the combustion references based upon the correction factors and the weighting factors; and control operation of the at least one fueling actuator and at least one air handling actuator based upon the modified values. In certain forms of the system the plurality of target emissions values or ranges comprise a target NOx value or range and a target AFR value or range and the errors comprise a first error between the target NOx value or range and a sensed engine-out NOx value and a second error between the target AFR value or range and a sensed engine-out AFR value. In certain forms the controller is structured to: determine a modified charge flow reference value if the first error does not exceed a first threshold and the second error exceeds a second threshold; determine a modified EGR flow reference value if the first error exceeds the first threshold, and the second error does not exceed the second threshold; and determine a modified fueling reference value if the first error exceeds the first threshold, and the second error exceeds the second threshold. In certain forms the modified fueling reference value comprises at least one of an injector rail pressure value and a start of injection value. In certain forms the controller is structured to leave unmodified the initial combustion reference values if the first difference does not exceed the first difference threshold and the second difference does not exceed the second difference threshold. In certain forms the controller is structured to determine correction factors and weighting factors for the combustion references in parallel. In certain forms the controller is structured to first determine weighting factors for the combustion references and second determine correction factors for the combustion references.

One embodiment is a method comprising: operating a combustion manager controller for an internal combustion engine to determine a plurality of combustion reference values; determining a first error between a NOx output of the engine and a target NOx output and a second error between an oxygen output of the engine and a target oxygen output of the engine; determining which if any of the plurality of combustion reference values to modify based upon the first error and the second error; determining a modification value for each selected combustion reference parameter; modifying the selected combustion reference parameter based upon the modification value; and operating at least one air handling actuator and at least one fueling system actuator utilizing the plurality of combustion reference values including the modified combustion reference parameter. In certain forms of the method the plurality of combustion reference values comprise an EGR reference value, a charge flow reference value, a fueling quantity reference value, an injection timing reference value, and a rail pressure reference value. In certain forms the act of determining which if any of the plurality of combustion reference values to modify based upon the first error and the second error comprises: selecting at least the charge flow reference value if the first error does not exceed a first error threshold, and the second error exceeds a second error threshold; selecting at least the EGR reference value if the first error exceeds the first error threshold, and the second error does not exceed the second error threshold; selecting at least one of the fueling quantity reference value, the injection timing reference value, and the rail pressure reference value if the first error exceeds the first error threshold, and the second error exceeds the second error threshold; and selecting none of the plurality of combustion reference values if the first error does not exceed the first error threshold, and the second error does not exceed the second error threshold. In certain forms the act of determining which if any of the plurality of combustion reference values to modify based upon the first error and the second error comprises selecting all of the plurality of combustion reference values if the first error exceeds the first error threshold. In certain forms the act of determining which if any of the plurality of combustion reference values to modify based upon the first error and the second error comprises: selecting only the charge flow reference value if the first error does not exceed a first error threshold, and the second error exceeds a second error threshold; and selecting only the EGR reference value if the first error exceeds the first error threshold, and the second error does not exceed the second error threshold. In certain forms the acts of determining which if any of the plurality of combustion reference values to modify based upon the first error and the second error and determining a modification value for each selected combustion reference parameter occur in parallel. In certain forms the act of determining a first error between a NOx output of the engine and a target NOx output is based upon a virtual measurement of NOx output of the engine. In certain forms the act of determining a first error between a NOx output of the engine and a target NOx output is based upon information of a physical sensor.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
   determining with a control system structured to control operation of an internal combustion engine system initial values for a plurality of combustion reference parameters;
   determining with the control system a first difference between an engine-out NOx value for the engine and a target engine-out NOx value and a second difference between an engine-out AFR value for the engine and a target engine-out AFR value;
   providing the first difference and the second difference to both a correction factor control component and a weighting factor control component, the correction factor control component and the weighting factor control component being in parallel control paths of a feedback control loop;
   selecting with the correction factor control component which if any of the initial values to modify based upon the first difference and the second difference;
   determining with the control system respective modification values for each of the initial values which is selected, the act of determining being performed by applying weighting factors determined by the weighting factor control component to the initial values selected by the control factor correction component;
   modifying with the control system each of the initial values which is selected based upon the one or more respective modification values to provide respective modified values; and
   determining with the control system one or more actuator control values based upon the values of the combustion reference parameters including the one or more modified values; and
   controlling with the control system at least one of an air handling system actuator and a fueling system actuator utilizing the one or more actuator control values.

2. The method of claim 1 wherein the plurality of combustion reference values comprise an EGR reference value, a charge flow reference value, a fueling quantity reference value, an injection timing reference value, and a rail pressure reference value.

3. The method of claim 2 wherein the act of selecting comprises:
   selecting at least the charge flow reference value if the first difference does not exceed a first difference threshold, and the second difference exceeds a second difference threshold;
   selecting at least the EGR reference value if the first difference exceeds the first difference threshold, and the second difference does not exceed the second difference threshold;
   selecting at least one of the fueling quantity reference value, the injection timing reference value, and the rail pressure reference value if the first difference exceeds the first difference threshold, and the second difference exceeds the second difference threshold; and
   selecting none of the plurality of combustion reference values if the first difference does not exceed the first difference threshold, and the second difference does not exceed the second difference threshold.

4. The method of claim 3 wherein the act of selecting comprises selecting all of the plurality of combustion reference values if the first difference exceeds the first difference threshold and the second difference exceeds the second difference threshold.

5. The method of claim 3 wherein the act of selecting comprises:
   selecting only the charge flow reference value if the first difference does not exceed a first difference threshold, and the second difference exceeds a second difference threshold; and
   selecting only the EGR reference value if the first difference exceeds the first difference threshold, and the second difference does not exceed the second difference threshold.

6. The method of claim 1 wherein the act of controlling at least one of an air handling system actuator and a fueling system actuator with the control system is based upon a static relationship between the plurality of combustion reference parameters and one or more engine operating conditions.

7. The method of claim 6 wherein the one or more engine operating conditions comprise engine speed and engine fueling.

8. A system comprising:
   an internal combustion engine system including at least one fueling actuator and at least one air handling actuator; and
   an electronic controller structured to:
   determine initial values for a plurality of combustion references,
   determine a plurality of target emissions values or ranges based upon the plurality of combustion references,
   determine errors between the emissions target values or ranges and sensed emissions information;
   provide the errors to both a correction factor control component and a weighting factor control component in separate control paths of a feedback controller,
   determine correction factors with the correction factor control component and weighting factors with the weighting factor control component for the combustion references, the weighting factors for an engine-out NOx and an engine-out AFR being based at least in part upon the errors between the emissions target values or ranges and sensed emissions information,
   selectably determine modified values for the combustion references based upon the correction factors and the weighting factors; and
   control operation of the at least one fueling actuator and at least one air handling actuator based upon the modified values.

9. The system of claim 8 wherein the plurality of target emissions values or ranges comprise a target NOx value or range and a target AFR value or range and the errors comprise a first error between the target NOx value or range and a sensed engine-out NOx value and a second error between the target AFR value or range and a sensed engine-out AFR value.

10. The system of claim 9 wherein the controller is structured to:
    determine a modified charge flow reference value if the first error does not exceed a first threshold and the second error exceeds a second threshold;
    determine a modified EGR flow reference value if the first error exceeds the first threshold, and the second error does not exceed the second threshold; and
    determine a modified fueling reference value if the first error exceeds the first threshold, and the second error exceeds the second threshold.

11. The system of claim 10 wherein the modified fueling reference value comprises at least one of an injector rail pressure value and a start of injection value.

12. The system of claim 10 wherein the controller is structured to leave unmodified the initial combustion reference values if the first difference does not exceed the first difference threshold and the second difference does not exceed the second difference threshold.

13. The system of claim 8 wherein the controller is structured to determine correction factors and weighting factors for the combustion references in parallel.

14. The system of claim 8 wherein the controller is structured to first determine weighting factors for the combustion references and second determine correction factors for the combustion references.

15. A method comprising:
operating a combustion manager controller for an internal combustion engine to determine a plurality of combustion reference values;
determining a first error between a NOx output of the engine and a target NOx output and a second error between an oxygen output of the engine and a target oxygen output of the engine;
provide the first error and the second error to both of a first control component and second control component, the first control component and the second control component being in divergent control paths of a combined feedback control loop;
determining with the first control component which if any of the plurality of combustion reference values to modify based upon the first error and the second error;
determining a modification value for each selected combustion reference parameter;
modifying the selected combustion reference parameter based upon the modification value, the modifying being based upon output of the first control component and output of the second control component; and
operating at least one air handling actuator and at least one fueling system actuator utilizing the plurality of combustion reference values including the modified combustion reference parameter.

16. The method of claim 15 wherein the plurality of combustion reference values comprise an EGR reference value, a charge flow reference value, a fueling quantity reference value, an injection timing reference value, and a rail pressure reference value.

17. The method of claim 16 wherein the act of determining which if any of the plurality of combustion reference values to modify based upon the first error and the second error comprises:
selecting at least the charge flow reference value if the first error does not exceed a first error threshold, and the second error exceeds a second error threshold;
selecting at least the EGR reference value if the first error exceeds the first error threshold, and the second error does not exceed the second error threshold;
selecting at least one of the fueling quantity reference value, the injection timing reference value, and the rail pressure reference value if the first error exceeds the first error threshold, and the second error exceeds the second error threshold; and
selecting none of the plurality of combustion reference values if the first error does not exceed the first error threshold, and the second error does not exceed the second error threshold.

18. The method of claim 17 wherein the act of determining which if any of the plurality of combustion reference values to modify based upon the first error and the second error comprises selecting all of the plurality of combustion reference values if the first error exceeds the first error threshold.

19. The method of claim 17 wherein the act of determining which if any of the plurality of combustion reference values to modify based upon the first error and the second error comprises:
selecting only the charge flow reference value if the first error does not exceed a first error threshold, and the second error exceeds a second error threshold; and
selecting only the EGR reference value if the first error exceeds the first error threshold, and the second error does not exceed the second error threshold.

20. The method of claim 17 wherein the acts of determining which if any of the plurality of combustion reference values to modify based upon the first error and the second error and determining a modification value for each selected combustion reference parameter occur in parallel.

21. The method of claim 15 wherein the act of determining a first error between a NOx output of the engine and a target NOx output is based upon a virtual measurement of NOx output of the engine.

22. The method of claim 15 wherein the act of determining a first error between a NOx output of the engine and a target NOx output is based upon information of a physical sensor.

* * * * *